Dec. 7, 1937.                    H. WEBER                    2,101,160
                              CONTROL DEVICE
                            Filed Aug. 13, 1936
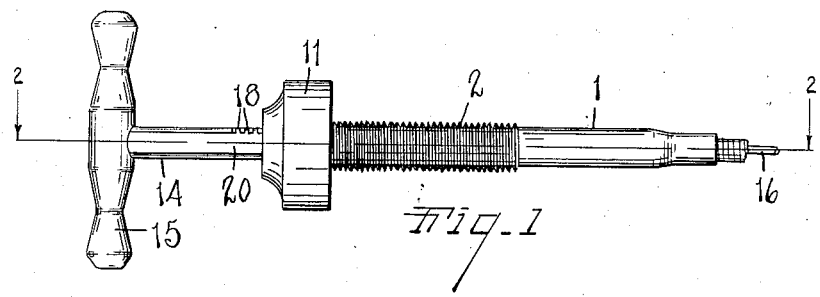
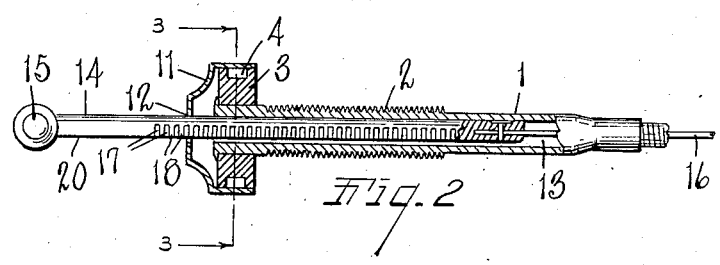
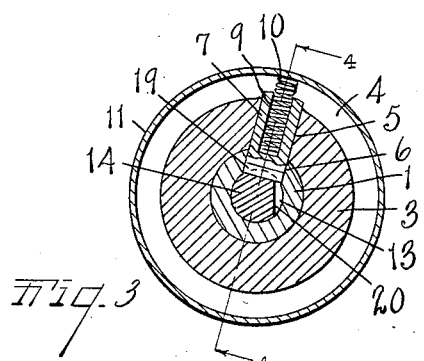
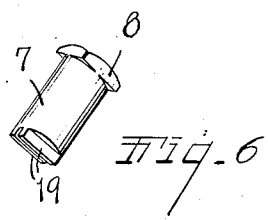
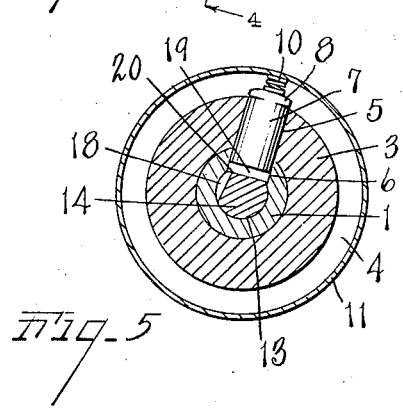
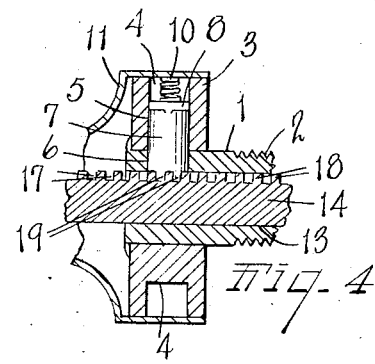
INVENTOR.
Herman Weber
BY Chappell, Earl T Chappell
ATTORNEYS Patented Dec. 7, 1937

2,101,160

UNITED STATES PATENT OFFICE 2,101,160

CONTROL DEVICE

Herman Weber, Kalamazoo, Mich., assignor to Shakespeare Products Company, Kalamazoo, Mich.

Application August 13, 1936, Serial No. 95,756

6 Claims. (Cl. 74—502)

The main objects of this invention are:

First, to provide a control device which is well adapted for the adjusting or controlling of throttles of airplane and like engines, the control member being locked and securely held in its adjusted position.

Second, to provide a control device having these advantages which is very convenient to manipulate and at the same time effective for the purpose and simple and economical in structure.

Objects relating to details and economies of the invention will appear from the description to follow. The invention is defined and pointed out in the claims.

A structure which is a preferred embodiment of the invention is illustrated in the accompanying drawing, in which:

Fig. 1 is a side view of my improved control device, the control or transmission wire or rod being omitted.

Fig. 2 is a view partially in longitudinal section on a line corresponding to line 2—2 of Fig. 1.

Fig. 3 is an enlarged transverse section on line 3—3 of Fig. 2 with the control rod in position to lock it against longitudinal movement.

Fig. 4 is a fragmentary view partially in section on line 4—4 of Fig. 3.

Fig. 5 is a fragmentary section corresponding to that of Fig. 3 with the control rod adjusted to position, permitting its longitudinal adjustment.

Fig. 6 is an enlarged perspective view of the bolt or detent.

Referring to the drawing, my control device comprises a tubular support member 1 adapted to be mounted on the panel or instrument board of an automobile or airplane or other engine, the support having a threaded portion 2 adapted to receive a clamping nut not illustrated.

On this tubular support 1, I mount a collar 3 which serves as a clamping member, this collar being provided with a peripheral groove or channel 4 and with a radial bore 5 registering with a radial bore 6 in the tubular support 1, these bores receiving the bolt or detent 7 which has a squared or non-circular outer end 8 engaging in the groove 4 thereby supporting the bolt against rotative movement or preventing its rotative movement. The bolt is provided with a longitudinal socket 9 receiving the thrust spring 10. This spring is retained under tension by means of the housing 11 preferably a sheet metal stamping suitably conformed as a finishing member, this housing being slipped over the collar, as illustrated, and having a central opening 12 aligned with the bore 13 of the tubular support.

The control rod 14 provided with a hand-piece 15 at its outer end is reciprocably and rotatably supported in the support for the adjustment of the control wire 16 which is connected to the throttle or other part to be adjusted or controlled.

The control rod is provided with a series of transverse slots 17 providing a longitudinal series of teeth 18 adapted to be brought by a rotative movement of the rod into and out of engagement with the teeth 19 of the bolt or detent 7. At one side of the series of teeth, the rod has a flattened surface 20, the plane of this surface being at an angle to the bottoms of the slots or the planes of the bottoms of the slots forming the teeth.

By thus forming and arranging the parts, the rod may be rotatably adjusted to engage and disengage the teeth and longitudinally adjusted when the teeth are disengaged to adjust the throttle, for example. The bolt or detent when coacting with the flattened surface serves as a friction member sufficiently resisting the movement of the control rod to facilitate accurate adjustment and to temporarily hold the parts in their adjusted position but it is intended that for permanently holding the parts in their adjusted positions the rod shall be rotated to engage the teeth with the detent. The detent serves to hold the rod in its rotatably adjusted positions and also serves to fully actuate the rod from one position to the other—that is, should it be incompletely adjusted, its thrust upon the angle resulting from the flattened side and the forming of the teeth will fully actuate the rod.

My improved control device is well adapted for use on various types of engines—stationary, automobile, and flying machine, and particularly where a plurality of engines are employed inasmuch as the throttle, for example, can be adjusted and secured in adjusted positions. Where employed on a choke, for example, the choke may be held in any position of adjustment until released or readjusted.

I have illustrated and described my improvements in an embodiment which I have found very practical. I have not attempted to illustrate certain modifications and adaptations which I contemplate as it is believed that this disclosure will enable those skilled in the art to embody or adapt my improvements as may be desired.

Having thus described my invention, what I claim as new and desire to secure by Letters Patent, is:

1. In a control device of the character set forth, the combination of a tubular support provided with a collar having a peripheral groove, said support and collar having registering radial bores, a toothed detent arranged in said bores and provided with a socket in its outer end and having a non-circular head engaging said groove whereby it is supported against rotative movement, a spring arranged in said socket, a housing sleeved on said collar and acting to retain said spring under tension, and a control rod reciprocable and rotatable in said support and having a series of transverse slots at one side providing a series of teeth and having a flattened surface at one side of said teeth, the bottoms of the teeth being at an angle to the said flattened surface so that the rod may be rotated to engage or disengage its said teeth with said detent in any of its longitudinally adjusted positions and may be longitudinally adjusted when the teeth are disengaged, and its said flattened surface engaged with said detent, the detent then acting as a friction member, the detent also acting to yieldably resist rotation of the rod from one rotative position to the other and also acting to fully actuate the rod as it is actuated from one rotative position to the other.

2. In a control device of the character set forth, the combination of a tubular support provided with a collar having a peripheral groove, said support and collar having registering radial bores, a toothed detent arranged in said bores and provided with a socket in its outer end and having a non-circular head engaging said groove whereby it is supported against rotative movement, a spring arranged in said socket, a housing sleeved on said collar and acting to retain said spring under tension, and a control rod reciprocable and rotatable in said support and having a series of transverse slots at one side providing a series of teeth and having a flattened surface at one side of said teeth so that the rod may be rotated to engage or disengage its said teeth with said detent in any of its longitudinally adjusted positions and may be longitudinally adjusted when the teeth are disengaged and its said flattened surface engaged with said detent.

3. In a control device of the character set forth, the combination of a tubular support provided with a radial bore, a spring detent arranged in said bore, and a control rod reciprocable and rotatable in said support and having a series of transverse slots at one side providing a series of teeth and a flattened surface at one side of said teeth, the bottoms of the teeth being at an angle to the said flattened surface so that the rod may be rotated to engage or disengage its said teeth with said detent in any of its longitudinally adjusted positions and may be longitudinally adjusted when the teeth are disengaged and its said flattened surface engaged with said detent, the detent then acting as a friction member, the detent also acting to yieldably resist rotation of the rod from one rotative position to the other and also acting to fully actuate the rod as it is actuated from one rotative position to the other.

4. In a control device of the character set forth, the combination of a tubular support provided with a radial bore, a spring detent arranged in said bore, and a control rod reciprocable and rotatable in said support and having a series of transverse slots at one side providing a series of teeth and a flattened surface at one side of said teeth so that the rod may be rotated to engage or disengage its said teeth with said detent in any of its longitudinally adjusted positions and may be longitudinally adjusted when the teeth are disengaged and its said flattened surface engaged with said detent, said flattened surface insuring engagement of the detent between said teeth when the rod is rotated and preventing accidental rotation thereof.

5. In a control device of the character set forth, the combination with a support, of a control rod reciprocable and rotatable in said support and having a longitudinal series of teeth and a flattened surface at one side of said teeth, the bottoms of the teeth being at an angle to the flattened surface, and a spring detent with which said teeth may be engaged and disengaged by a rotative movement of the control rod, the detent coacting with the flattened surface when it is disengaged from the teeth to constitute a friction member and acting to yieldably hold the rod in its rotatably adjusted positions, said flattened surface insuring engagement of the detent between said teeth when the rod is rotated and preventing accidental rotation thereof.

6. In a control device of the character set forth, the combination with a support, of a control rod reciprocable and rotatable in said support and having a longitudinal series of teeth and a flattened surface at one side of said teeth, and a spring detent with which said teeth may be engaged and disengaged by a rotative movement of the control rod, the detent coacting with the flattened surface when it is disengaged from the teeth to constitute a friction member and acting to yieldably hold the rod in its rotatably adjusted positions, said flattened surface insuring engagement of the detent between said teeth when the rod is rotated and preventing accidental rotation thereof.

HERMAN WEBER.